G. C. SPANGLER.
Can-Openers.
No. 149,537.　　　　　　　　　　Patented April 7, 1874.
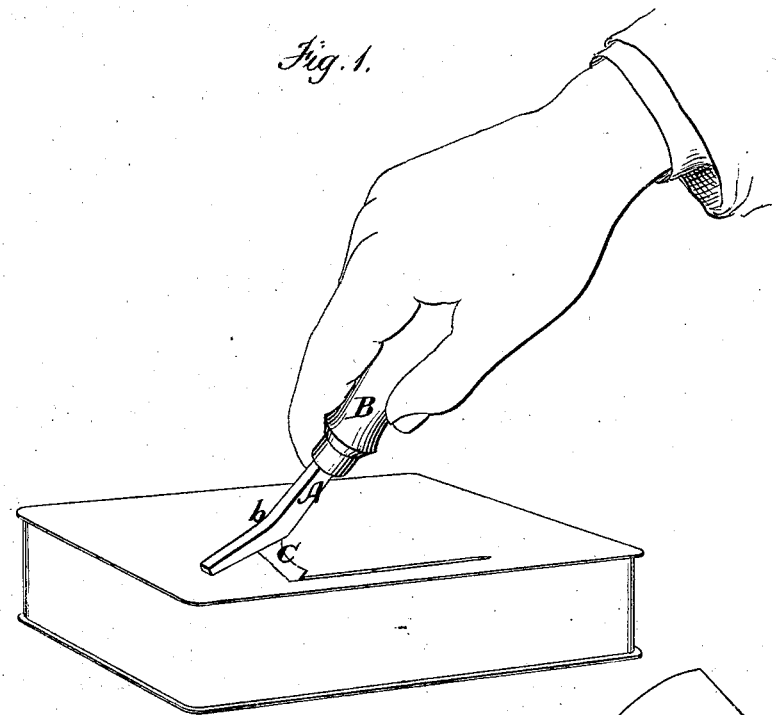
Fig. 1.
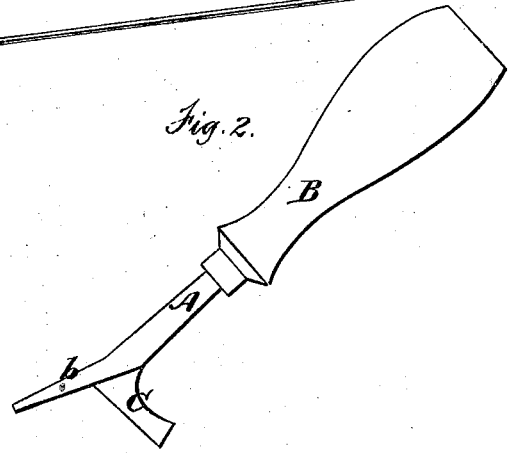
Fig. 2.
Witnesses.　　　Fig. 3.　　　Inventor.
　　　　　　　　　　　　　　　G. C. Spangler.
　　　　　　　　　　　　　　　by his Attys.
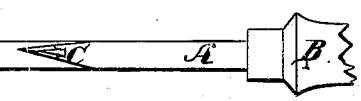
AM. PHOTO-LITHOGRAPHIC Co. N.Y. (OSBORNE'S PROCESS.)

UNITED STATES PATENT OFFICE.

GEORGE C. SPANGLER, OF ALLEGHENY, PENNSYLVANIA, ASSIGNOR TO WILLIAM H. GRAHAM AND H. A. SPANGLER, OF SAME PLACE.

IMPROVEMENT IN CAN-OPENERS.

Specification forming part of Letters Patent No. 149,537, dated April 7, 1874; application filed March 14, 1874.

*To all whom it may concern:*

Be it known that I, GEORGE C. SPANGLER, of the city and county of Allegheny, in the State of Pennsylvania, have invented a new and Improved Can-Opener; and I do hereby declare the following to be a full and exact description of the same, reference being had to the accompanying drawings, forming part of this specification, in which—

Figure 1 is a perspective view, showing my invention in operation; Fig. 2, a side elevation; and Fig. 3, a bottom view.

Similar letter of reference in the accompanying drawings denote the same parts.

My invention has for its object to provide for public use a cheap and simple device for cutting the ends of fruit and other cans, which shall be easily operated, and adapted to cut round or square openings.

To this end my invention consists in the improved tool which I will now proceed to describe.

In the drawings, A represents a shank of metal projecting from a suitable handle, B, and preferably bent slightly near its center, as shown at b. C represents a cutting-blade formed on the lower side of the shank A, about midway of its length, the edge of the blade forming an obtuse angle with the bent portion b of the shank.

The tool is operated by placing the end of the shank A on the surface of the can with the blade downward, as shown in Fig. 1, when, by depressing the handle, the blade is caused to penetrate the metal and cut a slit therein, the point of the shank acting as a fulcrum. When the blade has entered the can its full length, it is raised, the point of shank moved forward, and the operation continued until an incision of the desired length is made.

It will be seen, by reference to Fig. 3, that the blade is placed in a slightly-diagonal position on the shank, so that the cutting-edge of the blade is nearer one side of the shank than the back of the blade.

This construction adapts the tool to make a curved or circular incision in opening round cans, but at the same time does not prevent its cutting in a straight line in opening sardine-boxes, &c.

The obtuse angle of the blade facilitates its operation, adapting the entire cutting-edge to be brought to bear on the metal in its downward stroke.

The device is exceedingly simple, and can be operated with sufficient ease to be particularly adapted to family use.

I claim as my invention—

The can-opening tool described, consisting of the shank A, having the blade C projecting from its lower side at an obtuse angle, said blade being located diagonally in cross-section, substantially as described, for the purpose specified.

GEORGE C. SPANGLER.

Witnesses:
WM. H. GRAHAM,
WM. H. STERRIT.